United States Patent [19]

Meginnis

[11] 4,169,309

[45] Oct. 2, 1979

[54] METHOD OF MAKING A SIGHT GLASS ASSEMBLY

[76] Inventor: Charles E. Meginnis, 529-1/2 Nancy St., Charleston, W. Va. 25302

[21] Appl. No.: 919,722

[22] Filed: Jun. 27, 1978

Related U.S. Application Data

[63] Continuation-in-part of Ser. No. 585,817, Jun. 11, 1975, abandoned.

[51] Int. Cl.$^2$ ............................................. B23P 11/02
[52] U.S. Cl. ................................ 29/447; 29/DIG. 35; 73/334; 220/82 A; 350/320
[58] Field of Search .......................... 29/447, DIG. 35; 350/319, 320; 73/334; 220/82 A, 82 R

[56] References Cited

U.S. PATENT DOCUMENTS

| | | | |
|---|---|---|---|
| 1,331,091 | 2/1920 | Becker | 29/447 |
| 2,144,928 | 1/1939 | Moncrieff | 29/DIG. 35 UX |
| 2,218,722 | 10/1940 | Ross | 29/DIG. 35 UX |
| 2,252,504 | 8/1941 | Hahn | 29/447 UX |
| 2,419,648 | 4/1947 | Koontz | 29/447 X |
| 3,345,872 | 10/1967 | Meginnis | 73/334 |
| 3,371,413 | 3/1968 | Rundle | 29/447 X |
| 3,373,610 | 3/1968 | Stieber | 73/334 |
| 3,625,390 | 12/1971 | Meginnis | 220/82 R X |
| 3,849,531 | 11/1974 | Mefferd | 29/447 X |

FOREIGN PATENT DOCUMENTS

| | | | |
|---|---|---|---|
| 1311323 | 10/1962 | France | 29/447 |
| 379647 | 8/1964 | Switzerland | 29/447 |

*Primary Examiner*—Charlie T. Moon
*Attorney, Agent, or Firm*—Ward, Lalos, Leeds, Keegan & Lett

[57] ABSTRACT

A method of making a sight glass assembly generally including forming a housing having an opening therethrough provided with an annular wall, forming a lens having an annular peripheral wall provided with a diameter greater than the diameter of the housing wall at predetermined equilibrium conditions, effecting a change in the predetermined equilibrium conditions of the lens and housing sufficient to cause a dimensional change between the diameters of the housing and lens walls sufficient to permit the insertion of the lens into the opening of the housing, inserting the lens into the housing opening while maintaining the change in conditions so that the lens wall is positioned in opposed relation to the housing wall, and maintaining the lens in the opening with the lens and housing walls disposed in opposed relation while permitting a return to the equilibrium conditions of the lens and housing whereby the housing and lens wall will engage to place the lens in radial compression and form a fluid tight seal.

15 Claims, 4 Drawing Figures

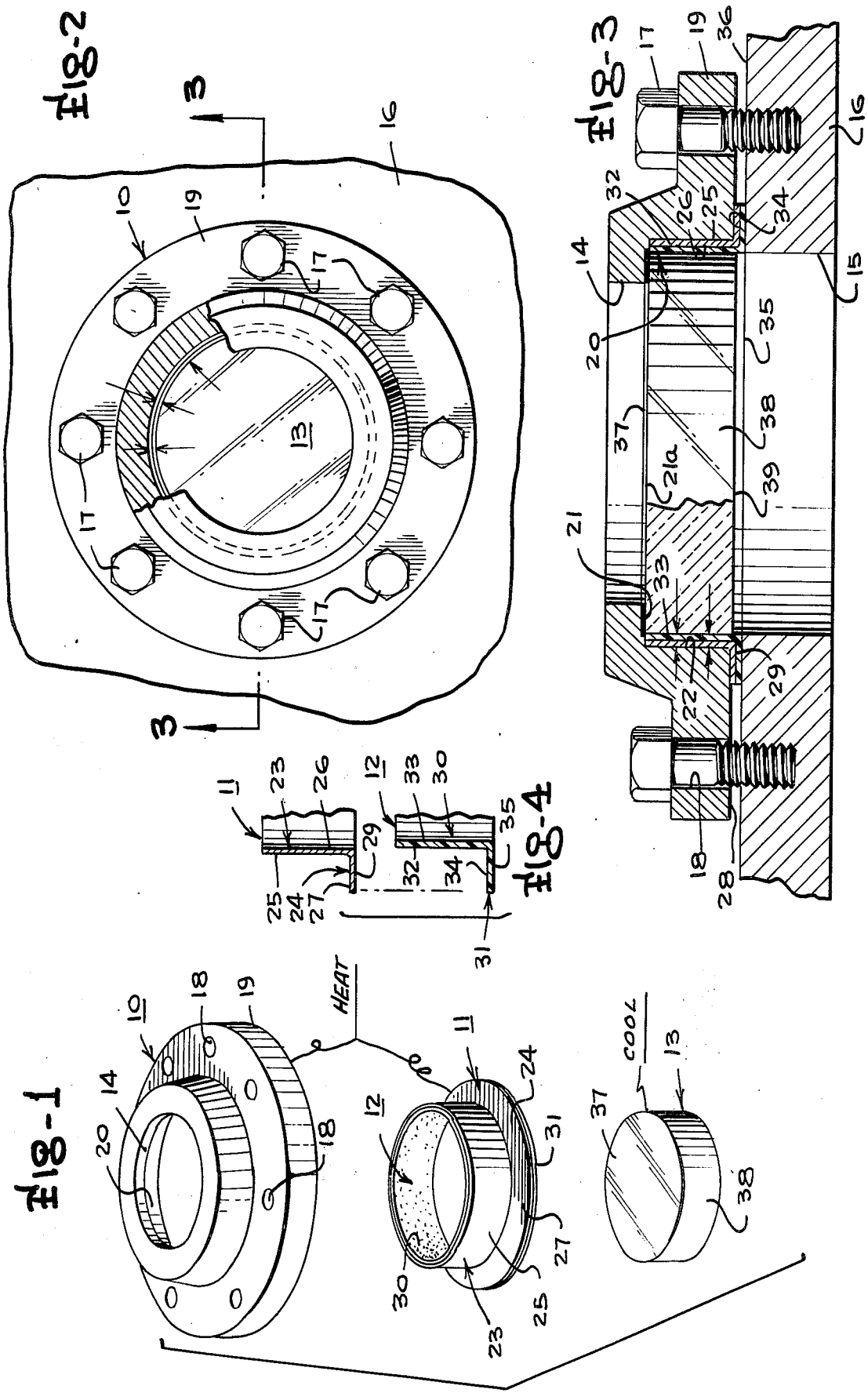

METHOD OF MAKING A SIGHT GLASS ASSEMBLY

This is a continuation-in-part application of Ser. No. 585,817, filed on June 11, 1975 now abandoned.

The present invention relates to an improved sight glass assembly, and more particularly to a sight glass assembly suitable for use with large vessels containing fluids under elevated pressures. The invention further contemplates a novel method of manufacturing a sight glass assembly.

In the prior art, there has been developed a type of sight glass assembly which generally includes a housing structure having an opening therethrough, which is adapted to be mounted across an opening in a vessel containing a fluid under an elevated pressure, and a lens mounted in the opening of the housing structure. In this particular type of sight glass assembly, it has been found that the principal source of failure has consisted of fractures of the lens resulting in leakage and blowouts. Such cause of failure has been obviated to a large extent in prior art sight glass designs wherein a packing member is provided between the wall of the housing opening and the periphery of the lens, which packing is placed under compression, causing it to expand laterally and correspondingly place the lens in radial compression and form a fluid tight seal between the lens and the housing structure. Such designs, however, are comparatively expansive to manufacture and require the periodic replacement of deteriorated components such as the packing members and gaskets thereof which are subject to either direct or indirect attack by the fluids contained within the vessels on which such assemblies are mounted, unless provision is made to shield such components from the fluids contained in the vessels.

Accordingly, it is the principal object of the present invention to provide a novel sight glass assembly.

Another object of the present invention is to provide a novel sight glass assembly suitable for use on vessels containing fluids under elevated pressures.

A further object of the present invention is to provide a novel sight glass assembly for use on vessels containing corrosive fluids under elevated pressures.

Another object of the present invention is to provide a novel sight glass assembly of the type utilizing a lens mounted in a housing wherein the housing impacts a compressive force about the periphery of the lens to place the lens under radial compression thus preventing a blowout of the lens upon the lens becoming fractured, and to form a fluid tight seal between the lens and the housing in which the lens is mounted.

A further object of the present invention is to provide a novel method of making a sight glass assembly.

Another object of the present invention is to provide a novel method of making a sight glass assembly consisting of a lens mounted in an opening provided in a housing wherein the housing imparts a compressive force about the periphery of the lens to place the lens in radial compression and form a fluid tight seal between the lens and the housing.

A further object of the present invention is to provide a novel sight glass assembly which is simple in design, economical to manufacture and highly effective in performance and reliability.

Other objects and advantages of the present invention will become more apparent to those persons having ordinary skill in the art to which the present invention pertains, from the following description taken in conjunction with the accompanying drawing, wherein:

FIG. 1 is an exploded view of an embodiment of the invention;

FIG. 2 is a top plan view of the embodiment illustrated in FIG. 1, mounted on a vessel containing a fluid;

FIG. 3 is an enlarged cross-sectional view taken along line 3—3 in FIG. 2; and

FIG. 4 is an enlarged cross-sectional view of the rigid and deformable liners of the embodiment.

The embodiment illustrated in FIGS. 1 through 4 generally includes a housing 10, a rigid liner 11, a deformable liner 12 and a lens 13. The housing structure generally has an annular configuration providing an opening 14 adapted to register with an opening 15 in a wall 16 of a vessel containing a fluid possibly corrosive in nature and at a different pressure and temperature. The housing structure is secured to the fluid vessel by means of a plurality of bolts 17 extending through suitable openings 18 circumferentially spaced in a flanged portion 19 of the housing, which are adapted to register with suitable holes in the wall of the fluid vessel. The opening 14 in the housing structure is provided with an enlarged section 20 which provides an annular shoulder 21 at the outer end thereof and an annular wall 22. Rigid liner 11 is mounted in the enlarged section of the housing opening and includes an annular portion 23 and a radially outwardly projecting annular flange portion 24. Annular portion 23 is provided with a radially outer surface 25 which engages annular housing wall 22, and a radially inner surface 26. Flange portion 24 is provided with an annular surface 27 which engages a mounting surface 28 of the housing structure and an annular surface 29.

Deformable liner 12 also is mounted within the enlarged section of the housing opening and includes an annular section 30 and a radially outwardly projecting annular flange 31. Deformable liner portion 30 is provided with a radially outer surface 32 which engages inner surface 26 of rigid liner portion 23, and a radially inner surface 33. Flange portion 31 of the deformable liner is provided with an annular surface 34 engaging the annular surface 29 of flange portion 27 of the rigid liner, and an annular surface 35 which is adapted to engage the outer surface 36 of vessel wall 16 about the periphery of opening 15.

Lens 13 also is mounted in the enlarged section of the housing opening and includes an outer end surface 37, the periphery of which engages shoulder 21, an annular side surface 38 which engages inner surface 33 of the deformable liner, and an inner surface 39 which is exposed to the interior of the vessel through the wall opening 15.

The assembly illustrated in FIGS. 1 through 3 is made by initially forming the lens and rigid liner so that the radius differential of lens 38 and rigid liner surface 26 is less than the thickness of portion 30 of the deformable liner, under predetermined equilibrium conditions such as at room temperature. In addition, the diameter of surface 25 of the rigid liner is formed fractionally larger than the diameter of housing wall 22 to permit an interference fit of the rigid liner in the enlarged section of the housing opening.

The components of the assembly are assembled by first heating the rigid liner to an elevated temperature to enlarge the inner diameter of annular portion 23 and/or cooling the lens to a reduced temperature to decrease the diameter of annular side wall 38 sufficiently to permit the insertion of portion 30 of the deformable liner between the rigid liner and the periphery of the lens. When such dimensional changes occur, the rigid liner and/or lens is maintained in such condition while the deformable liner is mounted on the periphery of the lens and the lens with the deformable liner disposed thereon is inserted into the rigid liner so that the annular engageable surfaces thereof are disposed in opposed relation. The rigid liner is then permitted to cool and/or the lens is permitted to heat to room temperature so that the rigid liner will contract and/or the lens will expand to compress the deformable liner and correspondingly place the lens in radial compression and form a fluid tight seal between the rigid liner and the periphery of the lens.

The subassembly consisting of the lens mounted in the rigid liner with the deformable liner interposed therebetween, then may be press fit into the enlarged section of the housing opening so that the periphery of outer surface 37 of the lens engages a gasket 21a provided in a recess in shoulder 21, the outer surface 25 of portion 23 engages annular housing wall 22 and flange portion 24 of the rigid liner engages mounting surface 28 of the housing. The assembly is then prepared for mounting on the vessel wall 16 which is accomplished simply by placing the assembly across wall opening 15 and aligning bolt holes 18 with the threaded holes in the vessel wall, and inserting and tightening bolts 17. As the bolts are tightened, flange portion 31 of the deformable liner will be compressed to form a liquid tight seal between the housing structure and the vessel wall.

Since the housing structure normally would be shielded from any possible corrosive effects of the fluid within the vessel, it may be fabricated from any suitable material having sufficient strength characteristics, such as carbon steel. Similarly, since the rigid liner also would be shielded from the effects of the fluid within the vessel, it also can be fabricated from any suitable material. The deformable liner, however, being exposed to the effects of the fluid within the container, preferably is formed of a material impervious to the effects of fluid such as TEFLON. In accordance with conventional practice, the lens may be formed of any transparent material having sufficient strength characteristics and being impervious to the effects of the fluid within the container, such as glass or a plastic composition.

In an alternative embodiment of the invention, particularly where a plastic lens is used, it is contemplated that the deformable liner may be eliminated. In the fabrication of such an embodiment the diameter of the lens would be formed greater than the inside diameter of the rigid liner under predetermined equilibrium conditions such as at room temperature, and the rigid liner would be heated to an elevated temperature and/or the lens would be cooled to a reduced temperature sufficiently to increase the inside diameter of the rigid liner and/or decrease the diameter of the lens to permit the insertion of the lens within the rigid liner. It will be appreciated that upon following such procedure and permitting the rigid liner to cool to room temperature and/or the lens to heat to room temperature while the lens is positioned within the rigid liner, the rigid liner will contact and/or the lens will expand so that the annular wall of the lens engages portion 23 of the rigid member to place the lens under radial compression and form a fluid tight seal between the periphery of the lens and the rigid liner. In such an embodiment, it is preferred that the rigid member be formed of a material impervious to the possible corrosive effects of the fluid contained within the vessel, such as stainless steel and the like.

In another embodiment of the invention, it is contemplated that both the deformable and rigid liners may be eliminated so that the periphery of the lens directly engages annular wall 22 of the housing structure. In the fabrication of such an embodiment, the diameter of the lens would be formed slightly greater than the diameter of annular housing wall 22, the housing structure would be heated to an elevated temperature to increase the diameter of housing wall 22 and/or the lens would be cooled to a reduced temperature to decrease the diameter of the lens, the lens would be placed within the enlarged section of the housing structure while either or both of the components were maintained at such temperatures and then with the lens positioned within the housing, the housing would be permitted to cool and/or the lens would be permitted to heat to room temperature so that the housing would contract and/or the lens would expand. Under such circumstances, annular surface 38 of the lens would engage annular wall 22 of the housing, placing the lens in radial compression and forming a fluid tight seal between the lens and the housing structure. It further is contemplated in connection with such embodiment that the housing structure be formed of or coated with a material impervious to the deleterious effects of the fluid within the container, or that a suitable shielding element be utilized.

As a still further embodiment of the invention it is contemplated that merely a deformable liner be used between the periphery of the lens and the housing structure. Under such circumstances, the radius differential of the lens and the housing wall 22 would be slightly less than the thickness of deformable liner portion 30. Such embodiment would be fabricated by heating the housing structure to an elevated temperature and/or cooling the lens to a reduced temperature to increase the diameter of housing wall 22 and/or decrease the diameter of lens wall 38. With such dimensional changes having occurred, the deformable liner is mounted on the lens and the lens with the liner mounted thereon is inserted in the enlarged section of the housing opening so that the periphery of end surface 37 of the lens engages the gasket on shoulder 21, portion 30 of the deformable liner is positioned between the lens and housing wall 22, and portion 31 of the liner is positioned against mounting surface 28 of the housing. With the components thus positioned, the housing is permitted to cool to room temperature and/or the lens is permitted to heat to room temperature thus causing the housing structure to contact and/or the lens to expand. Under such circumstances, portion 23 of the deformable liner will be compressed to place the lens in radial compression and form a fluid tight seal between the periphery of the lens and the housing structure.

Additionally, this embodiment could be fabricated by inserting the deformable liner into the housing opening and then inserting the lens into the liner. Another alternative of fabrication would include inserting the lens into the housing opening and then inserting the deformable liner between the lens and the housing.

In most commercial applications, it is contemplated that the types of assemblies as described primarily will be fabricated by utilizing the technique of effecting a temperature differential between the lens and the rigid liner or the housing structure. This is accomplished merely by (a) cooling the lens, (b) heating the rigid liner or housing structure alone, or (c) both cooling the lens and heating the rigid liner or housing structure. Under such circumstances, it is contemplated that the coefficients of thermal expansion of the lens and the rigid liner or housing structure can be similar or diverse. It further is contemplated, particularly in special applications where the coefficients of thermal expansion of the lens and the rigid liner or housing structure are sufficiently diverse that both the lens and the rigid liner or housing structure both may be heated or cooled to achieve the same results. In any of the aforementioned embodiments, it is to be noted that the expansion of the lens and/or the contraction of the rigid liner or housing structure results in an assembly wherein the rigid liner or housing imparts uniform radial compression forces on the annular side surface of the lens and opposed longitudinal shear forces distributed substantially symmetrically relative to a transverse plane disposed between the inner and outer ends of the lens, to provide optimum conditions in preventing a blowout of the lens whenever the lens might be fractured by physical or other means during the service life of the assembly.

It is to be noted that the transverse plane in the lens relative to which the longitudinal shear forces are distributed symmetrically, constitutes a shear plane. The presence of such transverse shear plane presents no adverse condition relative to the integrity of the sight glass in that there are no external forces other than the radially directed forces imposed by the rigid liner or housing member on the sight glass, which are directed along such plane. The arrangement of the present invention is to be distinguished from an arrangement wherein the sight glass is forced-fit into a bore in a housing member, which type of insertion produces a longitudinally disposed, substantially cylindrical shear plane oriented in the same direction of external forces acting on the inner or outer faces of the sight glass.

In the aforementioned embodiments of the invention, the rigid and deformable liners have been described as having a substantially L-shaped configurations. In this regard, it is to be understood that either of such liners may be provided with a radially inwardly projecting annular flange portion which could provide a support for the inner end of the lens.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of making a sight glass assembly comprising forming a housing having an opening therethrough, provided with an annular wall, forming a lens having an annular peripheral wall provided with a diameter not greater than the diameter of said housing wall at predetermined equilibrium conditions, effecting a change in said predetermined equilibrium conditions sufficient to cause an increase in the radius differential of said lens and housing walls, inserting said lens in said opening while maintaining said change in conditions so that said lens wall is positioned in opposed relation to said housing wall, inserting an annular liner formed of a deformable material and having a thickness greater than the radius differential of said lens and housing walls under said predetermined equilibrium conditions, between said lens and housing walls, and maintaining said liner interposed between said housing and said lens while permitting said housing and said lens to return approaching said equilibrium conditions whereby said housing and lens walls will engage said liner to place said lens in uniform radial compression and form a fluid tight seal between said housing and said lens.

2. A method according to claim 1 wherein the materials of said housing and said lens have different coefficients of thermal expansion.

3. A method according to claim 2 wherein the effecting of a change in said equilibrium conditions consists of effecting a temperature differential between said housing and said lens.

4. A method according to claim 3 wherein the effecting of said temperature differential consists of heating said housing to a predetermined elevated temperature.

5. A method according to claim 3 wherein the effecting of said temperature differential consists of cooling said lens to a predetermined reduced temperature.

6. A method according to claim 3 wherein the effecting of said temperature differential consists of heating said housing to an elevated temperature and cooling said lens to a reduced temperature.

7. A method according to claim 2 wherein the effecting of a change in said equilibrium conditions consists of heating said housing and said lens to an elevated temperature.

8. A method according to claim 2 wherein the effecting of a change in said equilibrium conditions consists of cooling said housing and said lens to a reduced temperature.

9. A method according to claim 1 wherein the materials of said housing and said lens have the same coefficient thermal expansion.

10. A method according to claim 9 wherein the effecting of a change in said equilibrium conditions consists of effecting a temperature differential between said housing and said lens.

11. A method of making a sight glass assembly, comprising forming a housing having an opening therethrough, provided with an annular wall, forming a lens having an annular peripheral wall provided with a diameter not greater than the diameter of said housing wall at predetermined equilibrium conditions, effecting a change in said predetermined equilibrium conditions sufficient to cause an increase in the radius differential of said lens and housing walls, positioning around the annular wall of said lens an annular liner formed of a deformable material and having a thickness greater than the radius differential of said lens and housing walls under said predetermined equilibrium conditions, between said lens and housing walls, inserting said lens and said liner in said opening while maintaining said change in conditions so that said lens wall and said liner are positioned in opposed relation to said housing wall, and maintaining said liner interposed between said housing and said lens while permitting said housing and said lens to return approaching said equilibrium conditions whereby said housing and lens walls will engage said liner to place said lens in radial compression and form a fluid tight seal between said housing and said lens.

12. A method of making a sight glass assembly comprising forming a housing having an opening therethrough provided with an annular wall, forming a lens having an annular peripheral wall provided with a diameter not greater than the diameter of said housing wall at predetermined equilibrium conditions, effecting a change in said predetermined equilibrium conditions sufficient to cause an increase in the radius differential of said lens and housing walls, positioning adjacent said annular wall of said opening an annular liner formed of a deformable material and having a thickness greater than the radius differential of said lens and housing walls under said predetermined equilibrium conditions, between said lens and housing walls, inserting said lens in said annular liner while maintaining said change in conditions so that said lens wall is positioned in opposed relation to said housing wall, and maintaining said liner interposed between said housing and said lens while permitting said housing and said lens to return approaching said equilibrium conditions whereby said housing and lens walls will engage said liner to place said lens in radial compression and form a fluid tight seal between said housing and said lens.

13. A method of making a sight glass assembly comprising forming a housing having an opening therethrough, provided with a peripheral wall, forming a lens having a peripheral wall sized to fit within said opening at predetermined equilibrium conditions, effecting a change in said predetermined equilibfium conditions sufficient to cause an increase in the radius differential of said lens and housing walls, inserting said lens in said opening while maintaining said change in conditions so that said lens wall is positioned in opposed relation to said housing wall, inserting a liner formed of a deformable material and having a thickness greater than the radius differential of said lens and housing walls under said predetermined equilibrium conditions, between said lens and housing walls, and maintaining said liner interposed between said housing and said lens while permitting said housing and said lens to return approaching said equilibrium conditions whereby said housing and lens walls will engage said liner to place said lens in radial compression and form a fluid tight seal between said housing and said lens.

14. A method of making a sight glass assembly, comprising forming a housing having an opening therethrough, provided with a peripheral wall, forming a lens having a peripheral wall sized to fit within said opening at predetermined equilibrium conditions, effecting a change in said predetermined equilibrium conditions sufficient to cause an increase in the radius differential of said lens and housing walls, positioning around the wall of said lens a liner formed of a deformable material and having a thickness greater than the radius differential of said lens and housing walls under said predetermined equilibrium conditions, between said lens and housing walls, inserting said lens and said liner in said opening while maintaining said change in conditions so that said lens wall and said liner are positioned in opposed relation to said housing wall, and maintaining said liner interposed between said housing and said lens while permitting said housing and said lens to return approaching said equilibrium conditions whereby said housing and lens walls will engage said liner to place said lens in radial compression and form a fluid tight seal between said housing and said lens.

15. A method of making a sight glass assembly comprising forming a housing having an opening therethrough provided with a peripheral wall, forming a lens having a peripheral wall sized to fit within said opening at predetermined equilibrium conditions, effecting a change in said predetermined equilibrium conditions suffcieient to cause an increase in the radius differential of said lens and housing walls, positioning adjacent said wall of said opening a liner formed of a deformable material and having a thickness greater than the radius differential of said lens and housing walls under said predetermined equilibrium conditions, between said lens and housing walls, inserting said lens in said liner while maintaining said change in conditions so that said lens wall is positioned in opposed relation to said housing wall, and maintaining said liner interposed between said housing and said lens while permitting said housing and said lens to return approaching said equilibrium conditions whereby said housing and lens walls will engage said liner to place said lens in radial compression and form a fluid tight seal between said housing and said lens.

* * * * *